2,809,114

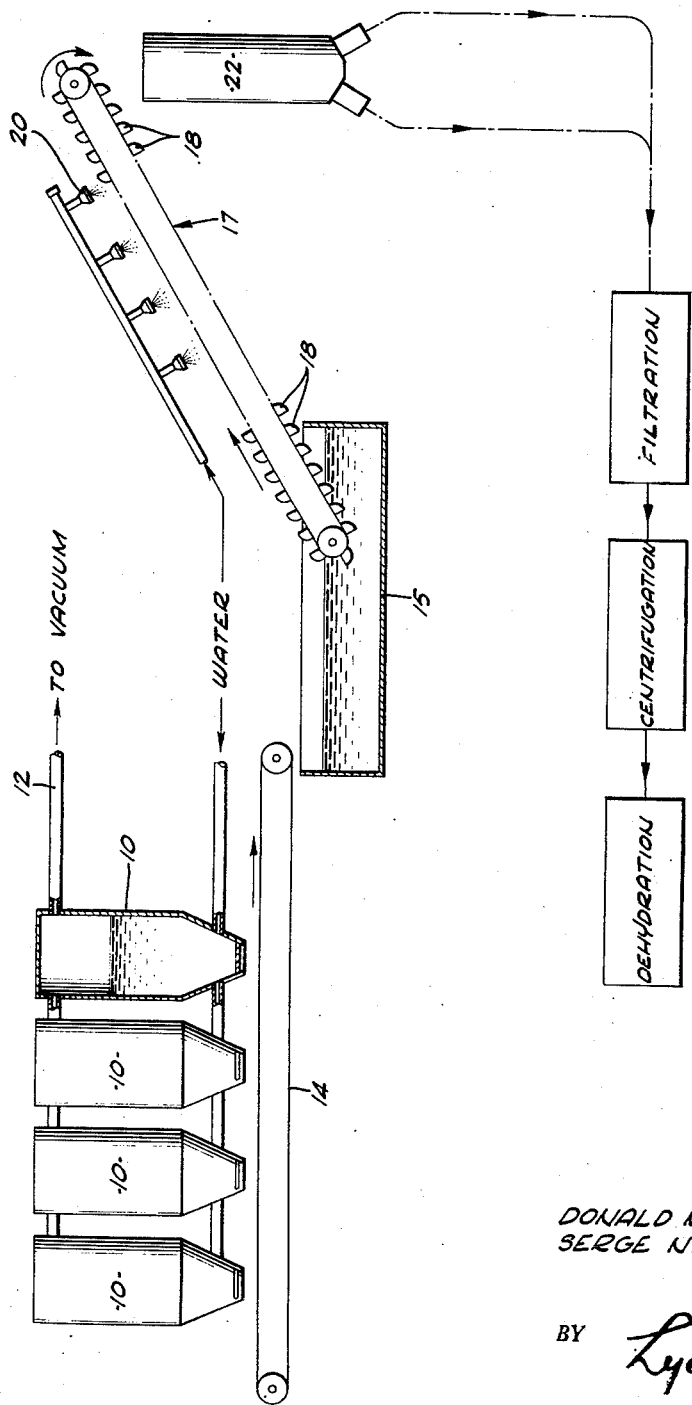

PROCESS FOR TREATING NUT MEATS

Donald M. Swarthout, Pasadena, and Serge de Witte, Los Angeles, Calif., assignors to California Walnut Growers Association, Los Angeles, Calif., a corporation of California Application May 17, 1954, Serial No. 430,274

11 Claims. (Cl. 99—126)

This invention relates to the treatment of nut meats and has particular reference to a process for freshening and improving the flavor of stale or rancid nut meat kernels.

The development of staleness and rancidity in nut meats, primarily due to improper storage and handling conditions, is a serious problem in the industry. While the nutritional value of the nut meats remains substantially unimpaired, stocks of this valuable food product have from time to time become unsalable due to development of an off-flavor produced by staleness and rancidity. Accordingly, it is the primary object of this invention to provide a process for the treatment of both stale and/or rancid nut meats to render the same fresh and palatable.

Another object of this invention is to provide a process for freshening and improving the flavor of stale or rancid nut meats, without impairing the appearance and other properties of the nut meats.

Other objects and advantages of this invention it is believed will be readily apparent from the following detailed description of a preferred embodiment thereof when read in connection with the accompanying drawing.

In the drawing:

The single figure is a diagrammatic flow sheet illustrating a preferred embodiment of the process of this invention.

The present invention may be employed with various species of nuts but will be described here as it is applied to walnut kernels. Referring now to the drawing, the kernels to be treated enter a series of air-tight tanks 10 through openings in the tops thereof. The tanks are then filled with water, best results being obtained when the ratio of water to kernels to about 2:1 or 3:1, but the proportion may be varied and satisfactory results obtained.

After filling the tanks, they are sealed and a relatively high vacuum of 28–29 inches of mercury is pulled through the vacuum line 12 and maintained for a period of about 45 minutes. While high vacuum is preferred, less efficient, but satisfactory results may be obtained under a lower vacuum. The vacuum removes a portion of the volatile products formed as a result of the staleness or rancidity of the walnuts. The vacuum also facilitates the deeper absorption or penetration of water into the kernels. The water, at this stage of the process, dissolves certain of the water soluble products of rancidity and in addition, physically washes the kernels. This washing action removes a portion of the surface oil from the kernels and also a portion of the crushed, bruised or damaged kernel tissue in which the development of rancidity is especially fast.

The vacuum is released after about 45 minutes and the kernels are flushed out through the bottom of the tanks 10 onto a conveyor 14 which delivers them into an open tank 15 which contains fresh water or a sodium chloride solution of sufficient concentration (for example, 6% NaCl by weight), to float the kernels. Further washing is provided in the tank by agitating the kernels with streams of water directed against them. The salt solution is preferred to fresh water because the kernels are more readily washed by streams of water if they are floating, and the kernels are also easier to remove from the tank.

An inclined bucket conveyor 17 removes the kernels from the tank 15, the buckets 18 preferably being formed of screen material to facilitate further washing of the kernels with fresh water from the spray heads 20. The kernels are delivered from the upper end of the conveyor 17 into a hopper 22 from whence they are dropped into filter bags (not shown) for a preliminary filtration therefrom of water. The kernels are then placed in a centrifuge for about 10 minutes for further water and oil removal, after which they are transferred to a dehydrator of multiple stage, forced draft open flame type. The temperature of the in-going air for the dehydrator is maintained at 135°–140° F. A jet of steam may be passed through the mass of kernels during the first stage in the dehydrator. The dehydration is carried out for a sufficient length of time (about two hours) to reduce the moisture content of the kernels from about 30% to about 4%.

The water vapor given off from the walnut kernels during dehydration carries with it certain products that are formed during development of rancidity. The penetration of water brought about by the initial vacuum treatment step assists in the removal of products of rancidity during the dehydration step.

From the above description it will be understood that the process of this invention comprises three basic steps: (1) subjecting the kernels to vacuum under water to remove products of rancidity having objectionable odors; (2) water washing and centrifuging to remove oil and crushed or damaged tissues which are relatively high in the products of rancidity; and (3) dehydration to remove additional products of rancidity, primarily through removal of water vapor. It has been found that any one of these three steps will result in an improved product and, depending upon the condition of the nut meats to be treated, in some cases only one of the steps is required. However, for proper treatment of advanced conditions of staleness and rancidity, the combination of all three steps is necessary.

The efficiency of the process has been proved by flavor or organoleptic tests which grade the untreated kernels as rancid and the treated kernels as edible. Chemical analysis of the oil from treated and untreated walnut kernels shows that treatment in accordance with the process of this invention reduces the peroxide value, one measure of rancidity, by approximately 50%. The acid number is also lowered, but not to the same extent. The following table represents the chemical analyses of two lots of walnuts treated in commercial quantities:

| Lot No. | Before Treatment | | After Treatment | |
| --- | --- | --- | --- | --- |
| | Peroxide Value | Acid No. | Peroxide Value | Acid No. |
| A | 1.26 | 0.31 | 0.66 | 0.25 |
| B | 1.10 | 0.31 | 0.30 | 0.26 |

The peroxide value is expressed in milliequivalents of oxygen per kilogram of oil.

In addition to the analytical data, smell and taste tests clearly established the marked difference in odor and flavor of the kernels before and after treatment.

Having fully described our invention, it is to be understood that we do not wish to be limited to the details set forth, but our invention is of the full scope of the appended claims.

We claim:

1. In a process for the treatment of nut meat kernels to remove products of rancidity therefrom, the steps comprising immersing the kernels in water in a closed tank, imposing a high vacuum on the interior of said tank and its contents, washing said kernels with water, centrifuging the washed kernels to remove water and oil therefrom, and heating said kernels to dehydrate the same.

2. In a process for the treatment of nut meat kernels to remove products of rancidity therefrom, the steps comprising immersing the kernels in water in a closed tank, imposing a high vacuum of about 28–29 inches of mercury on the interior of said tank and its contents, washing said kernels with water, centrifuging the washed kernels to remove water and oil therefrom, and heating said kernels to dehydrate the same to a water content of about 4%.

3. In a process for the treatment of nut meat kernels to remove products of rancidity therefrom, the steps comprising immersing the kernels in water in a closed tank, imposing a high vacuum of about 28–29 inches of mercury for a period of about 45 minutes on the interior of said tank and its contents, washing said kernels with water, centrifuging the washed kernels to remove water and oil therefrom, and heating said kernels to dehydrate the same to a water content of about 4%.

4. In a process for the treatment of nut meat kernels to remove products of rancidity therefrom, the steps comprising immersing the kernels in water in a closed tank and imposing a high vacuum on the interior of said tank and its contents to absorb water in said kernels, separating excess water from the kernels, and heating said kernels to remove water therefrom in the form of vapor, whereby said vapor carries with it products of rancidity.

5. In a process for the treatment of nut meat kernels to remove products of rancidity therefrom, the steps comprising immersing the kernels in water in a closed tank and imposing a high vacuum of about 28–29 inches of mercury for a period of about 45 minutes on the interior of said tank and its contents to absorb water in said kernels, separating excess water from the kernels, and heating said kernels to remove water therefrom in the form of vapor, whereby said vapor carries with it products of rancidity.

6. In a process for the treatment of nut meat kernels to remove products of rancidity therefrom, the steps comprising immersing the kernels in water in a closed tank and imposing a high vacuum on the interior of said tank and its contents, separating excess water from said kernels, and heating said kernels to dehydrate the same to a water content of about 4%.

7. In a process for the treatment of nut meat kernels to remove products of rancidity therefrom, the steps comprising immersing the kernels in water in a closed tank and imposing a high vacuum on the interior of said tank and its contents, separating excess water from said kernels, and heating said kernels with air at a temperature of about 135°–140° F. to dehydrate the same to a water content of about 4%.

8. In a process for the treatment of nut meat kernels to remove products of rancidity therefrom, the steps comprising immersing the kernels in water to absorb in said kernels a portion of the water, separating excess water from the kernels, and heating said kernels to remove water therefrom in the form of vapor whereby said vapor carries with it products of rancidity.

9. In a process for the treatment of nut meat kernels to remove products of rancidity therefrom, the steps comprising immersing the kernels in water to absorb in said kernels a portion of the water, separating excess water from the kernels, and heating said kernels with air to a temperature of about 135°–140° F. to remove water therefrom in the form of vapor whereby said vapor carries with it products of rancidity.

10. In a process for the treatment of nut meat kernels to remove products of rancidity therefrom, the steps comprising immersing the kernels in water to absorb in said kernels a portion of the water, separating excess water from the kernels, and heating said kernels to dehydrate the same to a water content of about 4%, said heating being sufficient to remove the water in the form of vapor carrying therewith products of rancidity.

11. In a process for the treatment of nut meat kernels to remove products of rancidity therefrom, the steps comprising immersing the kernels in water to absorb in said kernels a portion of the water, separating excess water from the kernels, and heating said kernels with air to a temperature of about 135°–140° F. to dehydrate the same to a water content of about 4%, said heating being sufficient to remove the water in the form of vapor carrying therewith products of rancidity.

References Cited in the file of this patent

UNITED STATES PATENTS

| | | |
|---|---|---|
| 726,065 | Iscovesco | Apr. 21, 1903 |
| 797,481 | White et al. | Aug. 15, 1905 |
| 1,848,806 | Seyer | Mar. 8, 1932 |
| 2,653,875 | Wergeland | Sept. 29, 1953 |